US011859934B2

(12) United States Patent
Jacobson et al.

(10) Patent No.: US 11,859,934 B2
(45) Date of Patent: Jan. 2, 2024

(54) ERGONOMIC HANDLE OF A FIREARM CLEANING APPARATUS

(71) Applicant: New Revo Brand Group, LLC, Plymouth, MN (US)

(72) Inventors: Ryan Jacobson, Minneapolis, MN (US); Dan Zaleskas, St. Louis Park, MN (US)

(73) Assignee: NEW REVO BRAND GROUP, LLC, Plymouth, MN (US)

( * ) Notice: Subject to any disclaimer, the term of this patent is extended or adjusted under 35 U.S.C. 154(b) by 75 days.

(21) Appl. No.: 17/452,585

(22) Filed: Oct. 28, 2021

(65) Prior Publication Data

US 2023/0133194 A1 May 4, 2023

(51) Int. Cl.
*F41A 29/02* (2006.01)
*B08B 9/043* (2006.01)

(52) U.S. Cl.
CPC ............ *F41A 29/02* (2013.01); *B08B 9/0436* (2013.01)

(58) Field of Classification Search
CPC ............................... F41A 29/02; B08B 9/0436
See application file for complete search history.

(56) References Cited

U.S. PATENT DOCUMENTS 1,556,494 A * 10/1925 Cooper ................... F41A 29/02 42/95
1,698,803 A * 1/1929 Petersen ................. F41A 29/02 403/78
2,911,660 A * 11/1959 Klemas .................. A61C 17/26 15/28
2,966,688 A 1/1961 Daubert
3,208,302 A * 9/1965 Lewis ..................... F41A 29/02 403/258
D204,461 S * 4/1966 Volker et al. ................ D22/108

(Continued)

FOREIGN PATENT DOCUMENTS

EP 2383051 A1 11/2011

OTHER PUBLICATIONS

Dewey Rods, .22LR-.45 cal Brass Pistol Rod—6.5 Inches. Model# 6-HB, https://deweyrods.com/product/22lr-45-cal-prass-pistol-rod-6-5-inches/, accessed Jan. 24, 2022, pp. 1-4.

(Continued)

*Primary Examiner* — Jonathan C Weber
(74) *Attorney, Agent, or Firm* — GRUMBLES LAW PLLC; Bryan Kravis

(57) ABSTRACT

A handle for use with a firearm cleaning rod may include an ergonomic handle. The ergonomic handle comprises a core having a top end, a grip, and a base; a bolster disposed on the top end provides an additional point for a user to apply force to the cleaning rod when cleaning a firearm. Below the bolster is the grip, which consists of a palm-engaging section and a finger-engaging section, where an inward curvature exists on the palm-engaging surface below the bolster; both sections may be covered with a textured overall for improved gripping by a user. Within the base is a housing that contains a connector for the purpose of securely connecting a cleaning rod to the ergonomic handle. The cleaning rod may include an accessory end for connecting firearm barrel cleaning accessories.

16 Claims, 6 Drawing Sheets

(56) References Cited

U.S. PATENT DOCUMENTS

| | | | | | |
|---|---|---|---|---|---|
| 3,609,790 | A * | 10/1971 | Butch | F41A 29/02 | 42/95 |
| 3,814,525 | A * | 6/1974 | Spencer | F41A 29/04 | 42/95 |
| 5,426,807 | A * | 6/1995 | Grimsley | E03F 9/005 | 15/104.095 |
| 5,636,400 | A * | 6/1997 | Young | A47L 15/0065 | 15/23 |
| 5,636,403 | A * | 6/1997 | Grimsley | B08B 9/045 | 15/104.095 |
| 9,733,038 | B2 * | 8/2017 | Bondar | A46B 5/02 | |
| 9,993,917 | B1 | 6/2018 | Vosbikian et al. | | |
| D946,694 | S * | 3/2022 | Chen | D22/199 | |
| 11,331,784 | B2 * | 5/2022 | Dyer | B43K 23/008 | |
| 2011/0083354 | A1 * | 4/2011 | Krieger | F41A 29/02 | 42/95 |
| 2013/0097794 | A1 * | 4/2013 | Brown | F41A 29/02 | 15/143.1 |
| 2013/0283658 | A1 * | 10/2013 | Buie, II | F41A 29/02 | 42/95 |
| 2017/0108306 | A1 * | 4/2017 | Bondar | A46B 5/026 | |
| 2017/0219308 | A1 * | 8/2017 | Bondar | A46B 5/0095 | |
| 2017/0350671 | A1 * | 12/2017 | Larue | H01Q 1/3275 | |
| 2019/0003797 | A1 * | 1/2019 | Marvin | B08B 9/0436 | |
| 2022/0112703 | A1 * | 4/2022 | Turner | E03C 1/306 | |

OTHER PUBLICATIONS

Gunslick, Gunslick 32011 Gsl 1-PC Cbn Fib CL Rod 22-260, https://www.amazon.com/Gunslick-32011-Gsl-1-PC-22-260/dp/B00162KSCQ, accessed Jan. 24, 2022, pp. 1-9.

Tipton, Deluxe 1-Piece Carbon Fiber Cleaning Rod, https://www.titonclean.com/deluxe-1-piece-carbon-fiber-cleaning-rob/146468R.html#start=1, accessed Jan. 24, 2022, pp. 1-5.

Windsor Design, No. 33 Bench Plane, https://www.harborfreight.com/no-33-bench-plane-97544.html, accessed Jan. 24, 2022, pp. 1-5.

* cited by examiner

ERGONOMIC HANDLE OF A FIREARM CLEANING APPARATUS

FIELD

This disclosure relates to an ergonomic handle. More specifically, it relates to an ergonomic handle for a firearm cleaning apparatus, which may include an attached rod that has an attachment end to be used with a plurality of gun bore cleaning tools; the ergonomic handle reduces the strain on a user's hand and wrist when cleaning a gun bore.

BACKGROUND

Throughout the life of firearms, their bores may be affected by debris, moisture, rust, copper, carbon, and gunpowder residue. Therefore, firearm bores need to be regularly cleaned so they may function properly and prevent the formation of rust that leads to decay. To accomplish this, individual users and gunsmiths must be able to access the inside surface of a firearm bore and any carbon or residue therein. However, conventional cleaning rods are configured in line with the handle; such configurations can lead to excessive strain on a user's hand and wrist. Therefore, a new bore cleaner is needed to alleviate the stress on a user's hand and wrist.

SUMMARY

According to the present disclosure, an ergonomic handle for a firearm cleaning apparatus may be comprised of a core that has a top end and a base; disposed in between the top end and base is a grip with two surfaces that are opposite each other, a finger-engaging surface and a palm-engaging surface. A bolster is disposed on the top end, above the palm-engaging surface, and a connector is disposed on the base below the finger-engaging surface where one end of a cleaning rod is attached to the connector.

Another aspect of the present disclosure of an ergonomic handle for a firearm cleaning apparatus may include a cleaning rod where one end is attached to the connector, wherein the connector is a rolling bearing, and another end of the cleaning rod consists of an accessory end that may connect to a plurality of bore-cleaning devices. Such bore cleaning accessories may include a jag, a bore brush, a star chamber brush, a star chamber mop, a star chamber pad, a slotted tip, and combinations thereof. Additionally, the cleaning rod may be made from materials such as carbon fibers, stainless steel, brass, aluminum, coated steel, fiberglass, and their combinations.

Additional aspects of the present disclosure of an ergonomic handle for a firearm cleaning apparatus may include a connector that is permanently attached to the handle with an adhesive. The grip may be partially or fully surrounded by an overlaid material that may consists of a different material than the handle's core. In some embodiments, the material that is overlaying the grip may be applied as an over-mold which cannot be non-destructively separated. Such over-molded applications may define up to three separate finger-engaging portions on the finger-engaging surface and a palm engaging portion on the palm-engaging surface. In some instances, the material that is overlaying the grip may be textured.

The finger-engaging surface may include, in some embodiments, at least one indentation disposed above the base; these indentations may consists of at least half to three-fourths of the finger-engaging surface. Further aspects of the indentation may include may consists of a chamfered lip disposed above the indentation where the chamfer defines an angle between the top end and the finger-engaging surface between 120 and 145 degrees.

Some further aspects of the ergonomic handle for a firearm cleaning may include embodiments where there is an inward curvature of the palm-engaging surface below the bolster.

According to the present disclosure, a method for using an ergonomic handle for a firearm cleaning apparatus may comprise an ergonomic handle having a core that has a top end and a base; disposed in between the top end and base is a grip with two surfaces that are opposite each other, a finger-engaging surface and a palm-engaging surface. A bolster is disposed on the top end, above the palm-engaging surface having an inward curvature below the bolster, and a connector is disposed on the base below the finger-engaging surface where one end of a cleaning rod is attached to the connector, and another end has an accessory connection; connecting an accessory to the accessory connection; then inserting the accessory into a firearm barrel; then pushing and pulling the accessory within the firearm a plurality of times, and finally removing the accessory from the firearm barrel. Some methods may include the addition of a cleaning rod consisting of a carbon fiber material that is connected to a rolling bearing connector via an adhesive. A further step in the method of using the an ergonomic handle for a firearm cleaning includes adding a cleaning patch to an accessory attached to the accessory end and further saturating the cleaning patch with a cleaning solvent.

A further aspect of the present disclosure of an ergonomic handle for a firearm cleaning apparatus may include a core that has a top end and a base; disposed in between the top end and base is a grip with two surfaces that are opposite each other, a finger-engaging surface and a palm-engaging surface; the grip consists of an over-molded textured overlay that covers both the finger-engaging surface and the palm-engaging surface having an inward curvature below the bolster. A connector disposed on the base below the finger-engaging surface is comprised of a rolling bearing that is connected to a carbon-fiber cleaning rod. The carbon-fiber cleaning rod and the ergonomic handle define an acute angle.

The above summary is not intended to describe each and every example or every implementation of the disclosure. The description that follows more particularly exemplifies various illustrative embodiments.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings.

DETAILED DESCRIPTION

Figure 1:
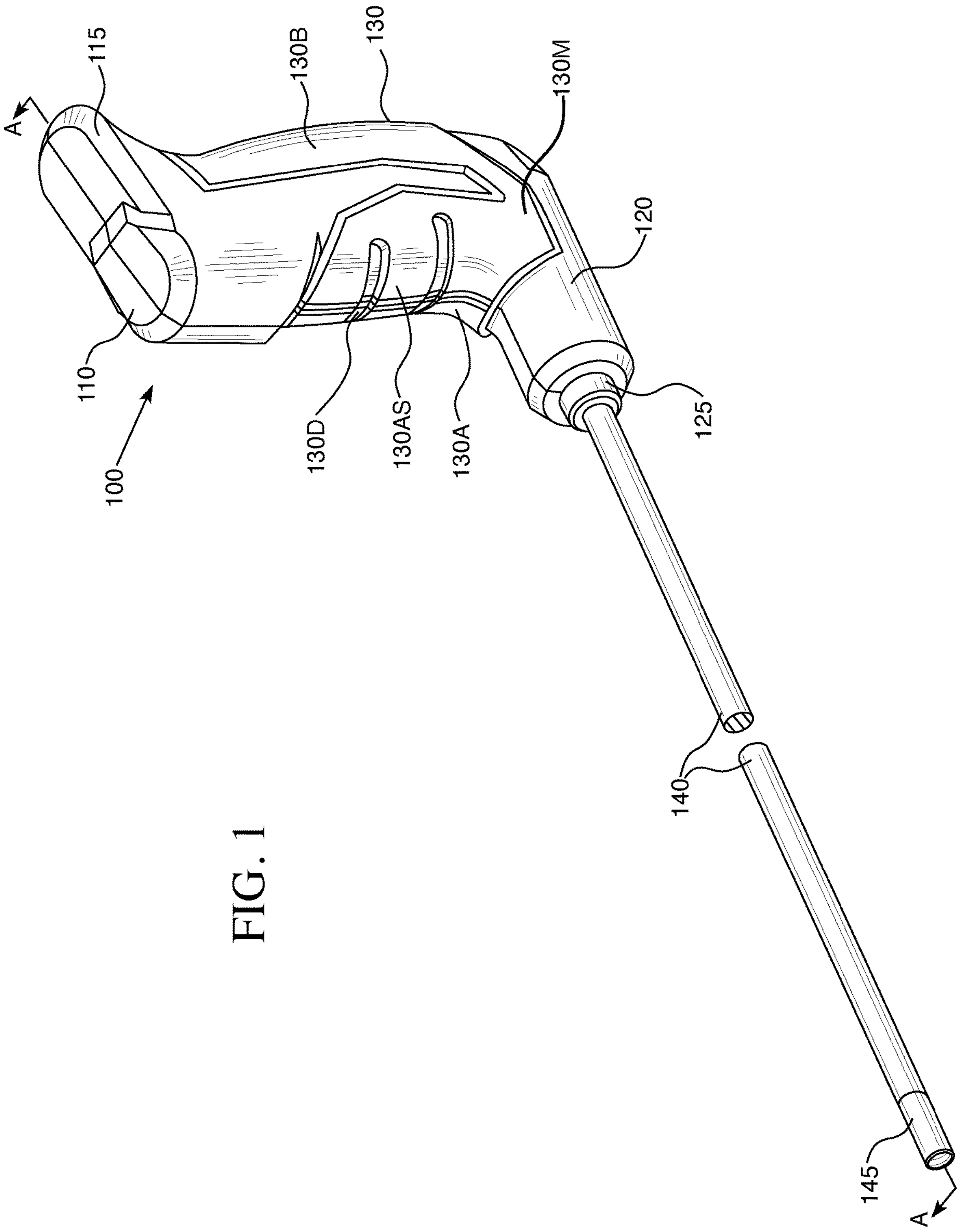
FIG. 1 is a perspective top view of an ergonomic handle of a firearm cleaning apparatus according to one embodiment of the present disclosure.

The present disclosure relates to an ergonomic handle of a firearm cleaning apparatus that is used to clean the interior barrel (i.e., the bore) of a gun. Various embodiments of the ergonomic handle of a firearm cleaning apparatus will be described in detail with reference to the drawings, wherein reference numerals represent like parts and assemblies throughout the several views. Reference to various embodiments does not limit the scope of the firearm cleaning apparatus disclosed herein. Additionally, any examples set forth in this specification are not intended to be limiting and merely set forth some of the many possible embodiments for the firearm cleaning apparatus. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

Existing gun bore cleaning devices rely on handles that are based on screwdriver handle technology where the cleaning rod is coaxial to the handle itself. This arrangement is sufficient to clean a gun barrel; however, that arrangement leads to extra stress on a user's wrist when the rod is pushed and pulled within a gun barrel. Further, when a cleaning rod is equipped with a cleaning accessory on one end, friction can be significantly increased when the cleaning rod is inserted into a firearm bore due to the nature of the accessories and the increased drag they cause inside a firearm bore. One of the improvements of this disclosure is the reorientation of the user's hand on a more ergonomic handle. The vertical orientation of the handle grip allows the user to have more leverage when pushing and pulling a cleaning rod within a gun barrel while reducing the stress on the user's wrist. Additionally, many different accessories may be attached to the accessory end of the cleaning rod, such as a jag, a bore brush, a star chamber brush, a star chamber mop, a star chamber pad, and a slotted tip. The accessory connection of the present disclosure is not limited to the previous list; any barrel cleaning accessory may be structured and configured in a way to allow attachment to the accessory connection.

A cleaning rod with a jag attachment and solvent patch takes considerable force to move within a gun barrel; by improving the handle of the gun rod to be in a vertical orientation, stress may be reduced on the user, and cleaning may be enhanced. Adding a rolling bearing to the connection between the cleaning rod and the ergonomic handle adds additional stress reduction on both the user's wrist and the firearm itself; a rotatable accessory will have less chance of damaging the internal surface of the firearm barrel. The cleaning rod itself may be constructed of carbon fibers, stainless steel, brass, aluminum, coated steel, or fiberglass. There is no limit to the material that may be chosen for the construction of the cleaning rod; the only limitation is on materials that would harm the interior of a gun barrel.

Figure 1A:
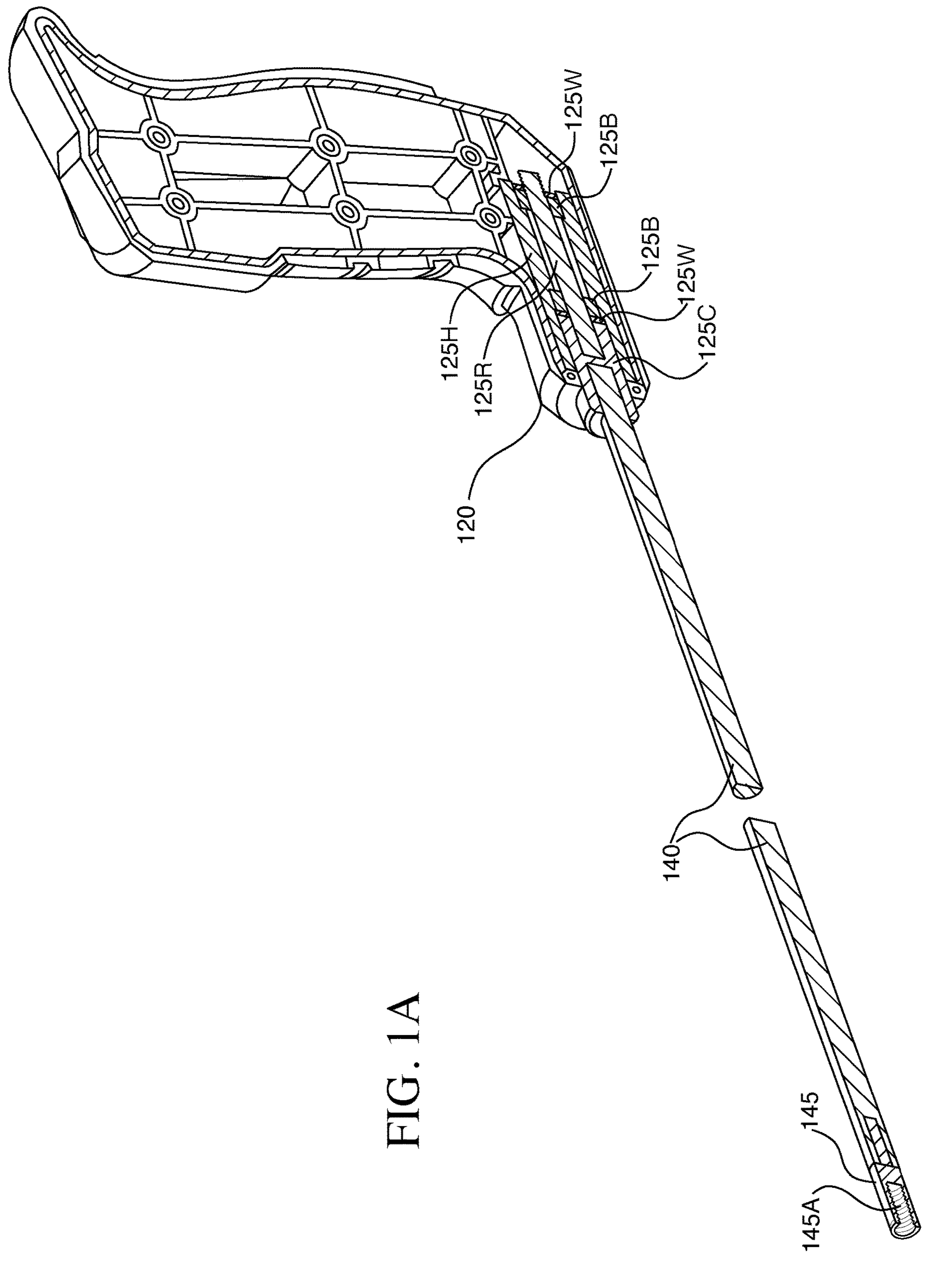
FIG. 1A is a cross-section along the plane A-A of the perspective top view of an ergonomic handle of the firearm cleaning apparatus of FIG. 1.

An example of one embodiment may be seen in FIG. 1, where an ergonomic handle, connector, and cleaning rod are fully displayed. The ergonomic handle can have a core and a bolster, wherein the core can be comprised of a top end, a grip, and a base opposite the top end. In some embodiments, the core and the bolster of the ergonomic handle can be hollow, as illustrated in FIG. 1A. In other embodiments, one or both of the core and the bolster may be solid while the remaining component(s) are hollow.

The view of FIG. 1 shows the device, where the ergonomic handle can be comprised of a bolster 115 disposed on the top end 110 of the core near the rear and top of the device. Directly below the top end 110 can be the grip 130 that can be covered by an overlay material 130M; just below the bolster 115 may be a palm engaging surface 130B. The bolster 115 can provide an additional leverage point and can help to prevent a user's hand from slipping off of the ergonomic handle 100; this is a vast improvement over screwdriver type cleaning rod handles where a user would need more grip strength to prevent slippage. The bolster 115 overhangs the palm engaging surface 130B by the inclusion of an inward curvature disposed on the palm engaging surface 130B just below the bolster 115. On the opposite side of the grip 130 with respect to the palm-engaging surface 130B may be a finger-engaging surface 130A. As illustrated in FIG. 1, the finger-engaging surface 130A can contain two indentations 130D to provide engagement for three fingers.

An overlay material 130M for the grip may be textured in some embodiments with a non-slip surface to provide users more purchase when gripping. For example, overlay material 130M can be manufactured from a non-slip material providing a high friction coefficient such as, but not limited to, a natural or synthetic rubber or similar material. The overlay material 130M may be overmolded around the grip 130, and the grip 130 and overlay material 130M can be structured and configured such that the grip 130 and overlay material 130M substantially cannot be non-destructively separated. However, other embodiments may have overlay material 130M and grip 130 manufactured separately, and structured and configured to be fit together after manufacture.

As described above and illustrated in FIG. 1, the core can further include a base 120 disposed on the bottom of the ergonomic handle 100; connected to the base may be connector 125 for cleaning rod 140 positioned below the finger-engaging surface. The connector 125 can be comprised of a connection for a cleaning rod 140 and a housing described further herein and illustrated in FIG. 1A, to allow the cleaning rod 140 to rotate when engaged within a firearm barrel. The bearings can reduce the chance of marring the inner surface of a firearm barrel by allowing the cleaning rod the ability to move with any rifling on the inner surface of a firearm barrel; this occurs primarily when the cleaning rod 140 has an accessory (not shown) attached to an accessory end 145 of the cleaning rod 140.

FIG. 1A is the cross-sectional view taken from the line A-A of the ergonomic handle 100 shown in FIG. 1. In FIG. 1A, connector 125 is comprised of a housing 12511 that contains two bearings 125B, a connection end 125C, and rod

125R along with two washer/spacer 125W. Connection end 125C can be attached to both a cleaning rod 140 and a rod 125R, wherein the cleaning rod 140 and the rod 125R are attached with an adhesive to generate a non-reversible connection to the connection end 125C. In some embodiments, the two bearings 125B can be disposed on the opposite ends of the rod 125R, wherein the two bearings 125B are secured to the housing 12511 allowing the free rotation of the cleaning rod 140, the connection end 125C and the rod 125R. In some embodiments, the bearings 125B are rolling bearings. In some embodiments, the rod 125R can be comprised of steel; however, other embodiments may use other construction materials for the rod. On the outside surface of each of the two bearings 125B is a washer/spacer 125W, shown clearly in FIG. 1A. A first washer/spacer 125W is disposed between a bearing 125B and the connection end 125C, and a second washer/spacer 125W is disposed on the outside of the bearing 125B; both washer/spacers 125W have the rod 125R within their central opening and are coaxial with the rod 125R. The housing 12511 can be disposed within the base 120 and can provide stability for the cleaning rod 140 that allows a user to apply more force when cleaning a firearm barrel. The connector 125C in this embodiment can be made of brass; other materials are contemplated for use in the connector. In this embodiment, the housing 12511 can be comprised of metal; however other embodiments may include a housing 12511 that is comprised of plastic or any other suitable material. A locking nut (not shown) may be connected to the end of the rod 125R to lock the two bearings 125B securely in place.

Further, in the cross-section of FIG. 1A, the threading 145A is shown for an accessory end 145 of a cleaning rod 140. Any firearm barrel accessory provided with a threaded attachment may be connected to the accessory end 145 with the use of the threading 145A. Examples of accessories that may be attached are a jag, a bore brush, a star chamber brush, a star chamber mop, a star chamber pad, or a slotted tip. These accessories may also include their own accessories, such as patches or swabs, which may subsequently be treated with firearm cleaning solutions and solvents.

Figure 2:
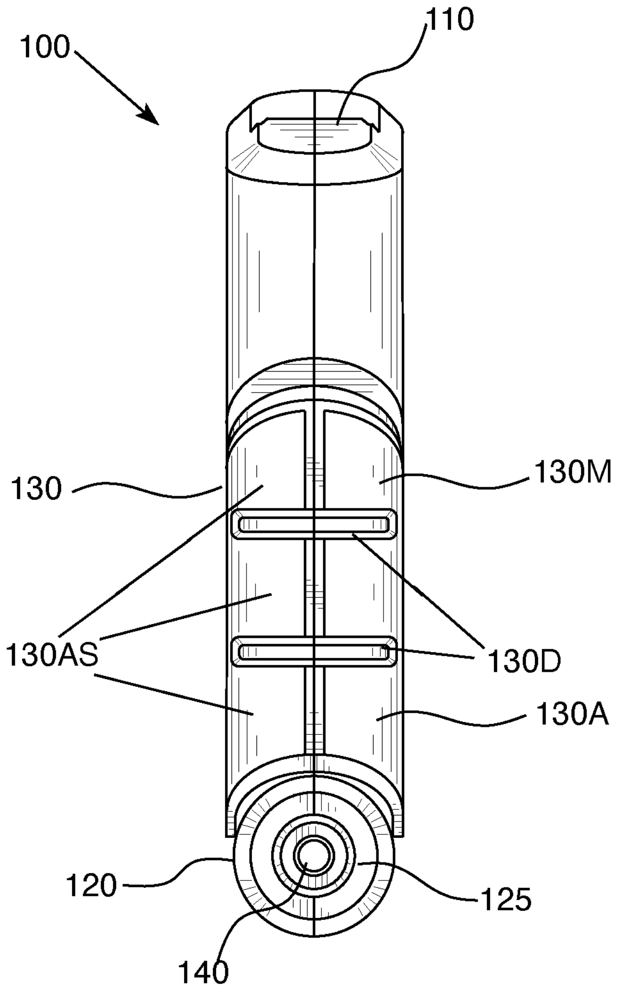
FIG. 2 is a front elevational view of an ergonomic handle of a firearm cleaning apparatus according to one embodiment of the present disclosure.

In the example of FIG. 2, an embodiment of an ergonomic handle for cleaning a firearm is shown in a front elevation. As described above, finger-engaging section 130A of the grip 130 can be covered in an overlay material 130M and can be portioned into three finger sections 130AS separated by two indentations 130D. The connector 125 and the cleaning rod 140 are demonstrated as being coaxial in this view of FIG. 2; the connector 125C can be disposed within the housing 12511, which in turn can be disposed within the base 120. The coaxial nature of the cleaning rod 140 and the connector 125 is also clearly shown in FIG. 2; all of the elements within the housing 12511 may be coaxial.

Figure 3:
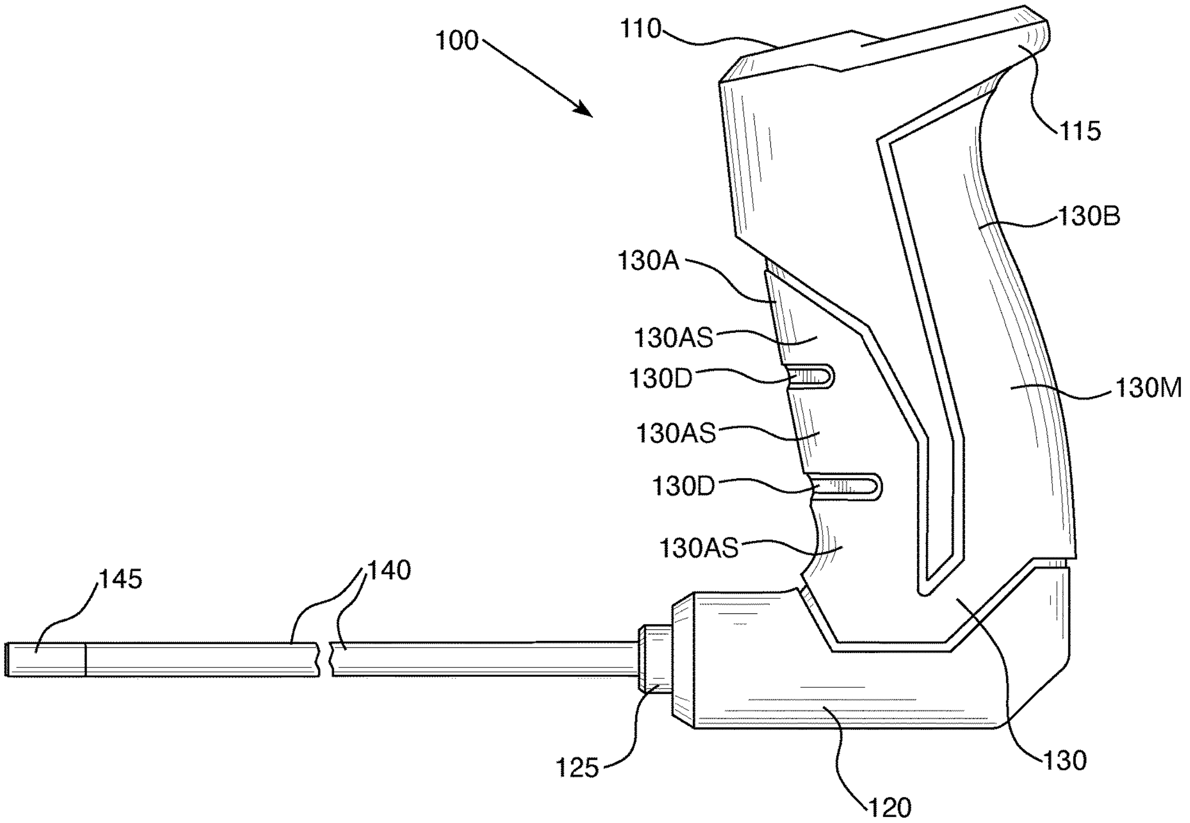
FIG. 3 is a right-side elevational view of an ergonomic handle of a firearm cleaning apparatus according to one embodiment of the present disclosure.

In the example of FIG. 3, an embodiment of an ergonomic handle for cleaning a firearm is shown in a right-side view. As illustrated, bolster 115 can protrude into the plane defined by the palm-engaging surface. In other embodiments, the bolster 115 may extend further beyond the plane defined by the palm-engaging surface as illustrated in the protrusion of FIG. 3; embodiments with such extensions of bolster 115 can also include an inward curvature disposed on the palm engaging surface 130B just below the bolster 115 to insure that a user's hand does not slip from the ergonomic handle. Furthermore, the angle of deflection of the bolster 115 may be more acute or oblique with respect to the plane defined by the top end 110. The bolster 115 enhances the stability of a user's grip on the ergonomic handle 100 by providing a point of purchase for a user's hand. In traditional screwdriver handle configurations for firearm bore cleaning devices, such purchase is lacking; a user's hand could easily slide forward when applying pressure leading to their hand slipping off of the screwdriver handle, which may lead to harm from the user's hand impacting the firearm.

Figure 4:
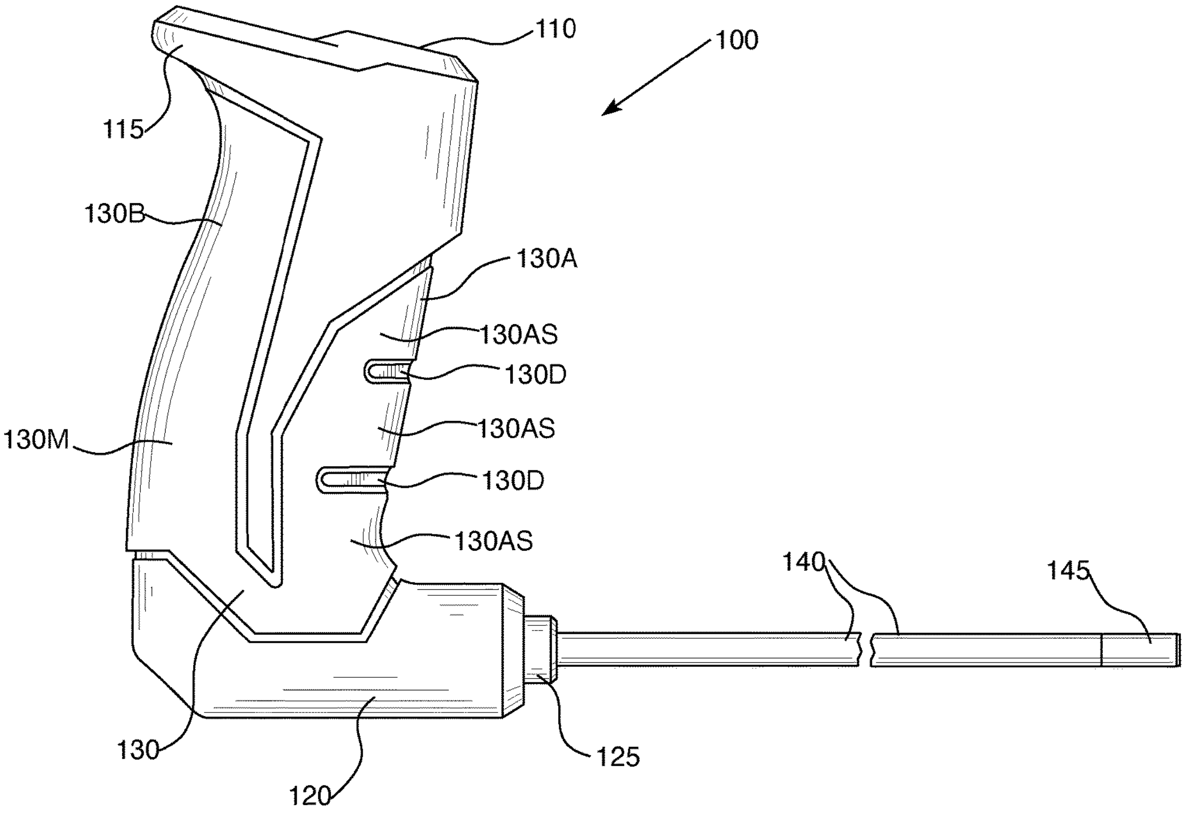
FIG. 4 is a left-side elevational view of an ergonomic handle of a firearm cleaning apparatus according to one embodiment of the present disclosure.

In this embodiment of an ergonomic handle 100, both the right and left sides are symmetrical, as demonstrated in the left side view of FIG. 4 and the right side view of FIG. 3; other embodiments may include changes in the overlay material 130M of the grip 130 that favor a right-handed user or a left-handed user. Such handed configurations will see changes to both the palm-engaging section 130B and the finger-engaging section 130A. Further, as illustrated in FIGS. 3 and 4, the cleaning rod 140, when attached to the connector, and the ergonomic handle can define an acute angle. For example, the angle defined by cleaning rod 140 and the ergonomic handle can be between 45 and 89 degrees, as illustrated in FIGS. 3 and 4.

Figure 5:
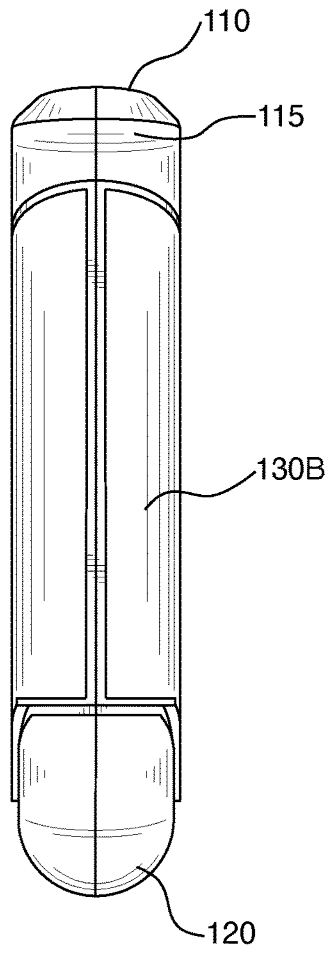
FIG. 5 is a back elevational view of an ergonomic handle of a firearm cleaning apparatus according to one embodiment of the present disclosure.

In the example of FIG. 5, the rear elevation view shows a bolster 115 that has the same width as the ergonomic handle 100 and is protruding directly from the top end 110. In some embodiments, the grip of the core may have a shorter width than the ergonomic handle 100. Therefore, the overlay material 130M can surround a perimeter of at least a portion of the grip 130 to make the width of the ergonomic handle 100 uniform.

Figure 6:
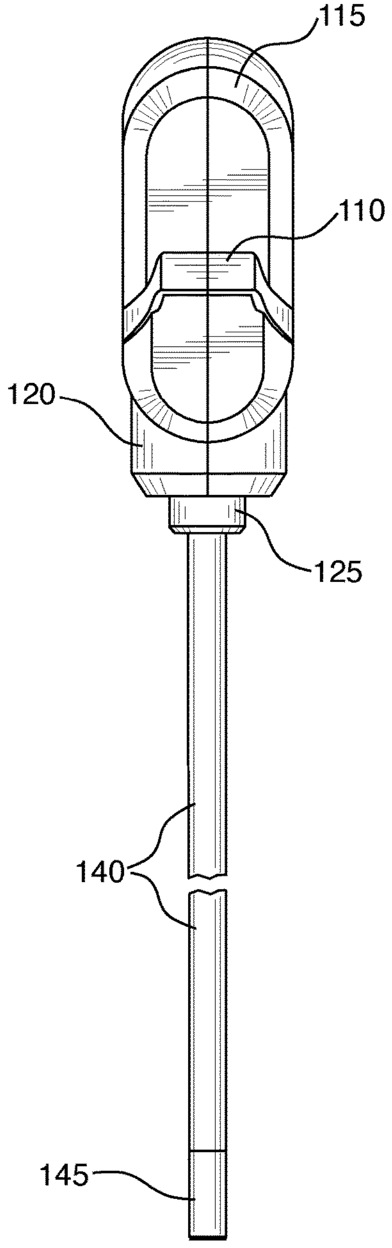
FIG. 6 is a top view of an ergonomic handle of a firearm cleaning apparatus according to one embodiment of the present disclosure.

In the examples shown in FIG. 6, the top side view of an embodiment of the present disclosure demonstrates the alignment of the ergonomic handle 100 and the cleaning rod 140; all visible parts of this embodiment can be centered on the plane that runs from the palm-engaging section 130B to the accessory connection 145. Again, in this embodiment of the ergonomic handle 100, both the right and left sides of the ergonomic handle 100 are symmetrical; as described earlier, other embodiments may include differential configurations for right-handed and left-handed users. Cleaning rod 140 can be maintained in its central location to provide proper distribution of user applied force, whether by a right-handed or left-handed user when using the device to clean a firearm barrel.

Figure 7:
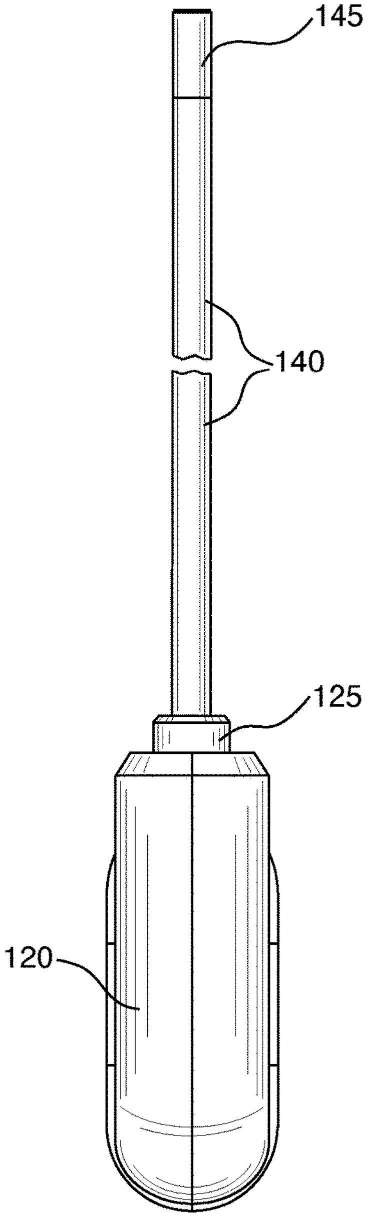
FIG. 7 is a bottom view of an ergonomic handle of a firearm cleaning apparatus according to one embodiment of the present disclosure.

In the example of the ergonomic handle 100 shown in FIG. 7, the bottom view of an embodiment of the present disclosure demonstrates the alignment of the ergonomic handle 100 and the cleaning rod 140; all visible parts of this embodiment can be centered on the plane that runs from the palm-engaging section 130B to the accessory connection 145. In this embodiment, again, both the right and left sides of the ergonomic handle 100 are symmetrical.

An ergonomic handle 100 can be used to clean a firearm by having a user grip the ergonomic handle 100 then connect an accessory, wherein the accessory is equipped with a threaded end, to an accessory end 145 by attaching the accessory's threaded end to the threading 145A of the accessory end 145; any such threaded accessory such as a jag, a bore brush, a star chamber brush, a star chamber mop, a star chamber pad, or a slotted tip may be attached to the accessory end 145. Once attached, the combined cleaning rod 140 and accessory can be inserted into a firearm barrel; the user, while still gripping the ergonomic handle 100 can begin pushing and pulling the ergonomic handle 100 a plurality of times so the accessory can remove the unwanted residue within the firearm barrel. Once the desired amount of cleaning has been achieved by the user, the combined cleaning rod 140 and accessory can be removed from the firearm barrel. The cleaning rod 140 used within the barrel can be comprised of a carbon fiber material; such a material will reduce the possibility of marring the inner surface of a firearm barrel when the combined cleaning rod 140 and accessory are pushed and pulled within the barrel. Additionally, the combined cleaning rod 140 and accessory may spin freely within the barrel with the assistance of the rolling bearings 125R connected to the opposite end of the cleaning rod 140 within the housing 125.

Some accessories that can be attached to the accessory end 145 may include their own attachable accessories; for instance, an accessory can be combined with a cleaning patch that may be saturated with a solvent to assist in the removal of residue within a firearm barrel.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed:

1. A firearm cleaning device comprising:

an ergonomic handle having a core and a bolster, wherein
- the core comprises a top end, a grip, and a base opposite the top end,
- the grip defines a finger-engaging surface opposite a palm-engaging surface, and
- the bolster is disposed on the top end above the palm-engaging surface;

a connector positioned on the base below the finger-engaging surface; and a cleaning rod attached to the connector and the cleaning rod freely rotating, wherein the cleaning rod and the ergonomic handle define an acute angle.

2. The firearm cleaning device of claim 1, wherein the connector is a rolling bearing.

3. The firearm cleaning device of claim 1, wherein the cleaning rod comprises a connection end and an accessory end.

4. The firearm cleaning device of claim 3, wherein the accessory end is attached to at least one of a jag, a bore brush, a star chamber brush, a star chamber mop, a star chamber pad, a slotted tip, and combinations thereof.

5. The firearm cleaning device of claim 3, wherein the cleaning rod is comprised of at least one material selected from a group consisting of carbon fibers, stainless steel, brass, aluminum, coated steel, fiberglass, and combinations thereof.

6. The firearm cleaning device of claim 5, wherein the connection end is permanently attached to the connector with an adhesive.

7. The firearm cleaning device of claim 1, wherein an overlay material surrounds a perimeter of at least a portion of the grip.

8. The firearm cleaning device of claim 7, wherein the core is comprised of a first material, and the overlay material is comprised of a second material that is different from the first material.

9. The firearm cleaning device of claim 8, wherein the overlay material is over-molded around the core, and the core and the overlay material are structured and configured such that the overlay material and core substantially cannot be non-destructively separated.

10. The firearm cleaning device of claim 9, wherein the overlay material defines three finger-engaging portions on the finger-engaging surface of the grip and a palm engaging portion on the palm-engaging surface of the grip.

11. The firearm cleaning device of claim 10, wherein the overlay material is textured.

12. The firearm cleaning device of claim 1, wherein the finger-engaging surface comprises at least one indentation disposed above the base.

13. The firearm cleaning device of claim 12, wherein the at least one indentation comprises at least half of the finger-engaging surface but no more than three-fourths of the finger-engaging surface.

14. The firearm cleaning device of claim 13, wherein the finger-engaging surface further comprises a chamfered lip disposed above the indentation, and wherein the chamfered lip defines an angle between the top end and the finger-engaging surface that is between 120 and 145 degrees.

15. The firearm cleaning device of claim 1, wherein the palm-engaging surface includes an inward curvature disposed below the bolster.

16. A firearm cleaning device comprising:

an ergonomic handle having
- a core wherein the core comprises a top end, a grip, and a base,
  - wherein the grip defines a finger-engaging surface opposite a palm-engaging surface, and
  - wherein the finger-engaging surface comprises at least one indentation disposed above the base,
- a bolster disposed on the top end above the palm-engaging surface, wherein the palm-engaging surface includes an inward curvature disposed below the bolster, and an overlay material that is over-molded around the grip of the core;

a rolling bearing positioned on the base below the finger-engaging surface; and a carbon fiber rod having a connection end and an accessory end, wherein the connection end is attached to the rolling bearing, and further wherein the carbon fiber rod and the ergonomic handle define an acute angle.

* * * * *